United States Patent
Yap et al.

(10) Patent No.: US 10,445,261 B2
(45) Date of Patent: Oct. 15, 2019

(54) SYSTEM MEMORY HAVING POINT-TO-POINT LINK THAT TRANSPORTS COMPRESSED TRAFFIC

(71) Applicant: Intel Corproration, Santa Clara, CA (US)

(72) Inventors: Kirk S. Yap, Westborough, MA (US); Daniel F. Cutter, Maynard, MA (US); Vinodh Gopal, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 15/395,032

(22) Filed: Dec. 30, 2016

(65) Prior Publication Data
US 2018/0189202 A1    Jul. 5, 2018

(51) Int. Cl.
*G06F 13/16*   (2006.01)
*G06F 13/40*   (2006.01)
*H04L 12/805*  (2013.01)

(52) U.S. Cl.
CPC ...... *G06F 13/1668* (2013.01); *G06F 13/4068* (2013.01); *H04L 47/365* (2013.01)

(58) Field of Classification Search
CPC ............. G06F 13/1668; G06F 13/4068; G06F 12/0802
See application file for complete search history.

(56) References Cited

U.S. PATENT DOCUMENTS

| | | |
|---|---|---|
| 5,912,839 A | 6/1999 | Ovshinsky et al. |
| 6,035,432 A | 3/2000 | Jeddeloh |
| 6,275,907 B1 * | 8/2001 | Baumgartner ...... G06F 12/0828 711/119 |
| 6,292,874 B1 | 9/2001 | Barnett |
| 7,590,918 B2 | 9/2009 | Parkinson |
| 7,600,078 B1 | 10/2009 | Cen et al. |
| 7,756,053 B2 | 7/2010 | Thomas et al. |
| 7,774,556 B2 | 8/2010 | Karamcheti et al. |
| 7,913,147 B2 | 3/2011 | Swaminathan et al. |

(Continued)

FOREIGN PATENT DOCUMENTS

| | | |
|---|---|---|
| CN | 1100540 A | 3/1995 |
| CN | 101079003 A | 11/2007 |

(Continued)

OTHER PUBLICATIONS

Meena, Jagan Singh, et al. "Overview of emerging nonvolatile memory technologies." Nanoscale research letters 9.1 (2014): 526. (Year: 2014).*

(Continued)

*Primary Examiner* — Charles Rones
*Assistant Examiner* — Hewy H Li
(74) *Attorney, Agent, or Firm* — Compass IP Law PC

(57) ABSTRACT

An apparatus is described. The apparatus includes a main memory controller having a point-to-point link interface to couple to a point-to-point link. The point-to-point link is to transport system memory traffic between said main memory controller and a main memory. The main memory controller includes at least one of compression logic circuitry to compress write information prior to being transmitted over the link; decompression logic circuitry to decompress read information after being received from the link.

23 Claims, 7 Drawing Sheets

(56) References Cited

U.S. PATENT DOCUMENTS

| | | | |
|---|---|---|---|
| 8,051,253 | B2 | 11/2011 | Okin et al. |
| 8,462,537 | B2 | 6/2013 | Karpov et al. |
| 8,462,577 | B2 | 6/2013 | Zeng et al. |
| 8,463,948 | B1 | 6/2013 | Qawami et al. |
| 8,605,531 | B2 | 12/2013 | Kau |
| 8,607,089 | B2 | 12/2013 | Qawami et al. |
| 8,612,676 | B2 | 12/2013 | Dahlen et al. |
| 8,612,809 | B2 | 12/2013 | Casper et al. |
| 8,626,997 | B2 | 1/2014 | Qawami et al. |
| 8,649,212 | B2 | 2/2014 | Kau et al. |
| 8,838,935 | B2 | 9/2014 | Hinton et al. |
| 9,087,584 | B2 | 7/2015 | Dahlen et al. |
| 9,342,453 | B2 | 5/2016 | Nale et al. |
| 9,378,133 | B2 | 6/2016 | Nachimuthu et al. |
| 9,378,142 | B2 | 6/2016 | Ramanujan et al. |
| 9,430,372 | B2 | 8/2016 | Nachimuthu et al. |
| 9,529,708 | B2 | 12/2016 | Puthiyedath et al. |
| 9,600,407 | B2 | 3/2017 | Faber |
| 9,600,416 | B2 | 3/2017 | Ramanujan et al. |
| 9,619,408 | B2 | 4/2017 | Nale et al. |
| 9,690,493 | B2 | 6/2017 | Dahlen et al. |
| 2005/0144388 | A1* | 6/2005 | Newburn ............ G06F 12/0802 711/118 |
| 2005/0160234 | A1 | 7/2005 | Newburn et al. |
| 2005/0273584 | A1 | 12/2005 | Wisecup et al. |
| 2006/0101206 | A1* | 5/2006 | Wood ................. G06F 12/0802 711/122 |
| 2007/0005922 | A1 | 1/2007 | Swaminathan et al. |
| 2007/0016724 | A1 | 1/2007 | Gaither et al. |
| 2007/0079073 | A1* | 4/2007 | Rosenbluth ......... G06F 9/30047 711/134 |
| 2007/0255891 | A1 | 11/2007 | Chow et al. |
| 2008/0016269 | A1 | 1/2008 | Chow et al. |
| 2008/0034148 | A1 | 2/2008 | Gower et al. |
| 2008/0082766 | A1 | 4/2008 | Okin et al. |
| 2008/0235443 | A1 | 9/2008 | Chow et al. |
| 2008/0270811 | A1 | 10/2008 | Chow et al. |
| 2009/0119498 | A1 | 5/2009 | Narayanan |
| 2009/0313416 | A1 | 12/2009 | Nation |
| 2010/0110748 | A1 | 5/2010 | Best |
| 2010/0131827 | A1 | 5/2010 | Sokolov et al. |
| 2010/0291867 | A1 | 11/2010 | Abdulla et al. |
| 2010/0293317 | A1 | 11/2010 | Confalonieri et al. |
| 2010/0306446 | A1 | 12/2010 | Villa et al. |
| 2010/0306453 | A1 | 12/2010 | Doller |
| 2010/0318718 | A1 | 12/2010 | Eilert et al. |
| 2011/0047365 | A1 | 2/2011 | Hentosh et al. |
| 2011/0060869 | A1 | 3/2011 | Schuette |
| 2011/0153916 | A1 | 6/2011 | Chinnaswamy et al. |
| 2011/0208900 | A1 | 8/2011 | Schuette et al. |
| 2011/0291884 | A1 | 12/2011 | Oh et al. |
| 2013/0166849 | A1* | 6/2013 | Beukema ............. G06F 15/167 711/147 |
| 2013/0268741 | A1 | 10/2013 | Daly et al. |
| 2013/0275661 | A1 | 10/2013 | Zimmer et al. |
| 2013/0282967 | A1 | 10/2013 | Ramanujan |
| 2013/0290597 | A1 | 10/2013 | Faber |
| 2014/0025874 | A1 | 1/2014 | Kwon et al. |
| 2014/0129767 | A1 | 5/2014 | Ramanujan et al. |
| 2014/0297938 | A1 | 10/2014 | Puthiyedath et al. |
| 2014/0359219 | A1 | 12/2014 | Evans et al. |
| 2015/0178214 | A1 | 6/2015 | Klameldeen et al. |
| 2017/0031821 | A1 | 2/2017 | Ramanujan et al. |
| 2017/0139649 | A1 | 5/2017 | Puthiyedath et al. |
| 2017/0249250 | A1 | 8/2017 | Ramanujan et al. |
| 2017/0249266 | A1 | 8/2017 | Nale et al. |
| 2018/0138921 | A1* | 5/2018 | Arelakis ............. H03M 7/6088 |

FOREIGN PATENT DOCUMENTS

| | | |
|---|---|---|
| CN | 101620539 B | 12/2013 |
| WO | 2005002060 A2 | 1/2005 |
| WO | 2016039866 A1 | 3/2016 |

OTHER PUBLICATIONS

"What is a packet?" Dec. 1, 2000. HowStuffWorks.com. Retrieved May 14, 2019. (Year: 2000).*

International Search Report and Written Opinion for PCT Patent Application No. PCT/US2017/61374, dated Mar. 29, 2018, 14 pages.

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array," https://www.flashmemorysummit.com/English/Collaterals/Proceedings/2011/Pr-oceedings.sub.--Chrono.sub.--2011.html, Flash Memory Summit 2011 Proceedings, Aug. 11, 2011.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

Dhiman, et al. "PDRAM: A Hybrid PRAM and DRAM Main Memory System", Jul. 26, 2009, Department of Computer Science and Engineering, 6 pages.

Freitas et al., "Storage-class memory: The next storage system technology", IBM J. Res. & Dev., Jul./Sep. 2008, pp. 439-447, vol. 52, No. 4/5.

Jacob, "The Memory System You Can't Avoid It, You Can't Ignore It, You Can't Fake It," Morgan & Claypool, Synthesis Lectures on Computer Architecture, vol. 4, No. 1, pp. 1-77, Jun. 2009.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09 Proceedings of the 36th Annual International Symposium on Computer Architecture, pp. 2-13, Jun. 20-24, 2009.

Mearian, "IBM announces computer memory breakthrough Phase-change memory offers 100 times the write performance of NANO flash", Jun. 30, 2011, 3 pgs.

Mogul et al., "Operating System Support for NVM'DRAM Hybrid Main Memory", 12th Workshop on Hot Topics in Operating Systems {HatOS XII), May 18, 2009, 9 pgs.

Quereshi et al., "Scalable High Performance Main Memory System Using Phase-Change Memory Technology", ISCA '09, Jun. 20, 2009, 10 pgs., Austin, Texas, USA.

Raoux et al., "Phase-Change Random Access Memory: A Scalable Technology," IBM Journal of Research and Development, vol. 52, Issue 4, pp. 465-479, Jul. 2008.

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994.

\* cited by examiner

SYSTEM MEMORY HAVING POINT-TO-POINT LINK THAT TRANSPORTS COMPRESSED TRAFFIC

FILED OF INVENTION

The field of invention pertains generally to computing systems, and, more specifically, to a system memory having a point-to-point link that transports compressed traffic.

BACKGROUND

Computing system designers are increasingly interested in improving the efficiency of their designed systems. System memory, also referred to as main memory, is increasingly becoming an area where efficiency improvements can be made.

FIGURES

A better understanding of the present invention can be obtained from the following detailed description in conjunction with the following drawings, in which.

DETAILED DESCRIPTION 1.0 Multi-Level System Memory

Figure 1:
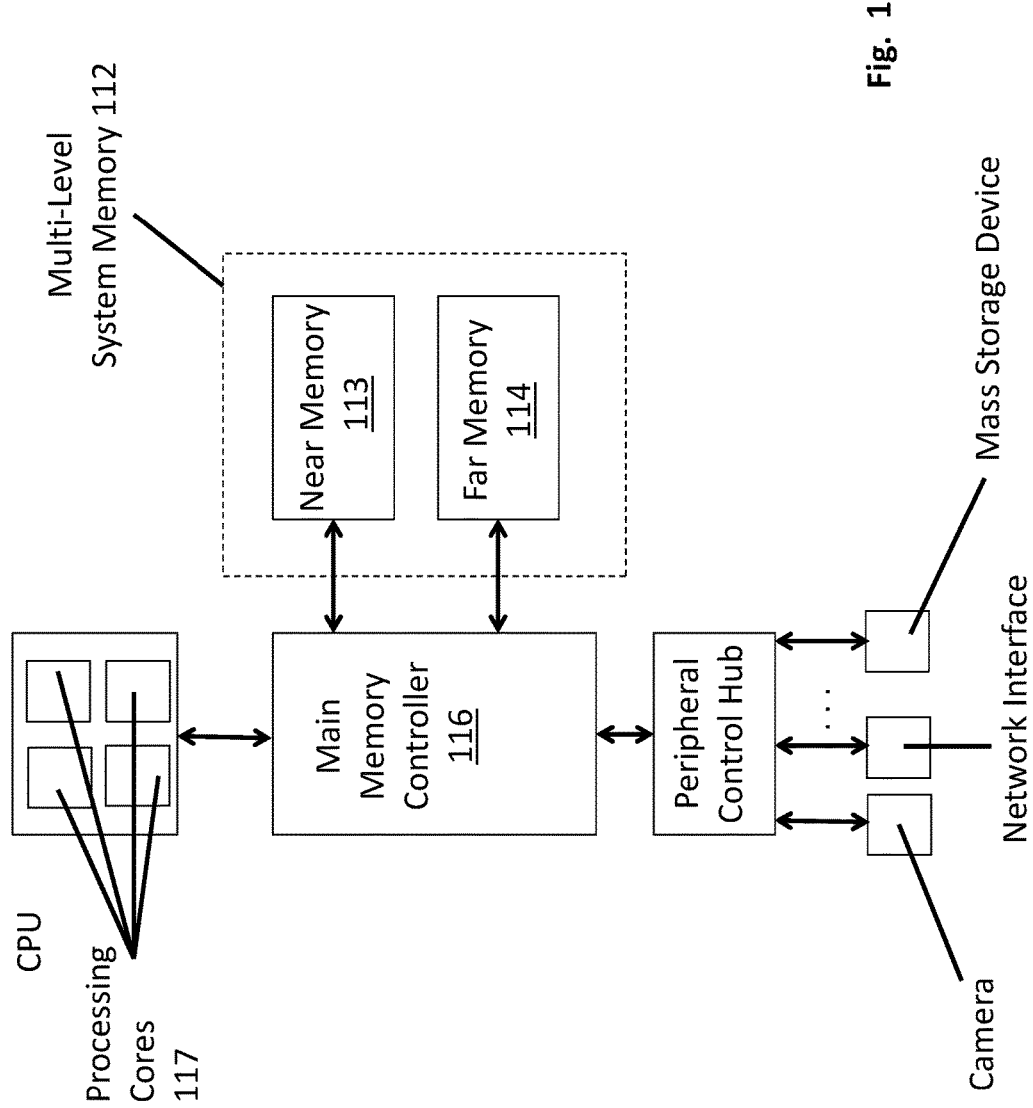
FIG. 1 shows a computing system having a multi-level system memory.

One of the ways to improve system memory performance is to have a multi-level system memory. FIG. 1 shows an embodiment of a computing system 100 having a multi-tiered or multi-level system memory 112. According to various embodiments, a smaller, faster near memory 113 may be utilized as a cache for a larger far memory 114.

The use of cache memories for computing systems is well-known. In the case where near memory 113 is used as a cache, near memory 113 is used to store an additional copy of those data items in far memory 114 that are expected to be more frequently called upon by the computing system. The near memory cache 113 has lower access times than the lower tiered far memory 114 region. By storing the more frequently called upon items in near memory 113, the system memory 112 will be observed as faster because the system will often read items that are being stored in faster near memory 113. For an implementation using a write-back technique, the copy of data items in near memory 113 may contain data that has been updated by the central processing unit (CPU), and is thus more up-to-date than the data in far memory 114. The process of writing back 'dirty' cache entries to far memory 114 ensures that such changes are not lost.

According to some embodiments, for example, the near memory 113 exhibits reduced access times by having a faster clock speed than the far memory 114. Here, the near memory 113 may be a faster (e.g., lower access time), volatile system memory technology (e.g., high performance dynamic random access memory (DRAM)) and/or static random access (SRAM) memory cells co-located with the memory controller 116. By contrast, far memory 114 may be either a volatile memory technology implemented with a slower clock speed (e.g., a DRAM component that receives a slower clock) or, e.g., a non volatile memory technology that may be slower (e.g., longer access time) than volatile/DRAM memory or whatever technology is used for near memory.

For example, far memory 114 may be comprised of an emerging non volatile random access memory technology such as, to name a few possibilities, a phase change based memory, three dimensional crosspoint memory device, or other byte addressable nonvolatile memory devices, "write-in-place" non volatile main memory devices, memory devices that use chalcogenide, single or multiple level flash memory, multi-threshold level flash memory, a ferro-electric based memory (e.g., FRAM), a magnetic based memory (e.g., MRAM), a spin transfer torque based memory (e.g., STT-RAM), a resistor based memory (e.g., ReRAM), a Memristor based memory, universal memory, Ge2Sb2Te5 memory, programmable metallization cell memory, amorphous cell memory, Ovshinsky memory, etc.

Such emerging non volatile random access memory technologies typically have some combination of the following: 1) higher storage densities than DRAM (e.g., by being constructed in three-dimensional (3D) circuit structures (e.g., a crosspoint 3D circuit structure)); 2) lower power consumption densities than DRAM (e.g., because they do not need refreshing); and/or, 3) access latency that is slower than DRAM yet still faster than traditional non-volatile memory technologies such as FLASH. The latter characteristic in particular permits various emerging byte addressable non volatile memory technologies to be used in a main system memory role rather than a traditional mass storage role (which is the traditional architectural location of non volatile storage).

Regardless of whether far memory 114 is composed of a volatile or non volatile memory technology, in various embodiments far memory 114 acts as a true system memory in that it supports finer grained data accesses (e.g., cache lines) rather than larger based accesses associated with traditional, non volatile mass storage (e.g., solid state drive (SSD), hard disk drive (HDD)), and/or, otherwise acts as an (e.g., byte) addressable memory that the program code being executed by processor(s) of the CPU operate out of. However, far memory 114 may be inefficient when accessed for a small number of consecutive bytes (e.g., less than 128 bytes) of data, the effect of which may be mitigated by the presence of near memory 113 operating as cache which is able to efficiently handle such requests.

Because near memory 113 acts as a cache, near memory 113 may not have formal addressing space. Rather, in some cases, far memory 114 defines the individually addressable memory space of the computing system's main memory. In various embodiments near memory 113 acts as a cache for far memory 114 rather than acting a last level CPU cache. Generally, a CPU cache is optimized for servicing CPU transactions, and will add significant penalties (such as cache snoop overhead and cache eviction flows in the case of hit) to other memory users such as Direct Memory Access (DMA)-capable devices in a Peripheral Control Hub (PCH). By contrast, a memory side cache is designed to handle accesses directed to system memory, irrespective of whether they arrive from the CPU, from the Peripheral Control Hub, or from some other device such as display controller.

In various embodiments, the memory controller 116 and/or near memory 113 may include local cache information (hereafter referred to as "Metadata") so that the memory controller 116 can determine whether a cache hit or cache miss has occurred in near memory 113 for any incoming memory request. The metadata may also be stored in near memory 113.

In the case of an incoming write request, if there is a cache hit, the memory controller 116 writes the data (e.g., a 64-byte CPU cache line) associated with the request directly over the cached version in near memory 113. Likewise, in the case of a cache miss, in an embodiment, the memory controller 116 also writes the data associated with the request into near memory 113, potentially first having fetched from far memory 114 any missing parts of the data required to make up the minimum size of data that can be marked in Metadata as being valid in near memory 113, in a technique known as 'underfill'. However, if the entry in the near memory cache 113 that the content is to be written into has been allocated to a different system memory address and contains newer data than held in far memory 114 (ie. it is dirty), the data occupying the entry must be evicted from near memory 113 and written into far memory 114.

In the case of an incoming read request, if there is a cache hit, the memory controller 116 responds to the request by reading the version of the cache line from near memory 113 and providing it to the requestor. By contrast, if there is a cache miss, the memory controller 116 reads the requested cache line from far memory 114 and not only provides the cache line to the requestor but also writes another copy of the cache line into near memory 113. In many cases, the amount of data requested from far memory 114 and the amount of data written to near memory 113 will be larger than that requested by the incoming read request. Using a larger data size from far memory or to near memory increases the probability of a cache hit for a subsequent transaction to a nearby memory location.

In general, cache lines may be written to and/or read from near memory and/or far memory at different levels of granularity (e.g., writes and/or reads only occur at cache line granularity (and, e.g., byte addressability for writes/or reads is handled internally within the memory controller), byte granularity (e.g., true byte addressability in which the memory controller writes and/or reads only an identified one or more bytes within a cache line), or granularities in between.) Additionally, note that the size of the cache line maintained within near memory and/or far memory may be larger than the cache line size maintained by CPU level caches. Different types of near memory caching architecture are possible (e.g., direct mapped, set associative, etc.).

The physical implementation of near memory and far memory in any particular system may vary from embodiment. For example, DRAM near memory devices may be coupled to a first memory channel whereas emerging non volatile memory devices may be coupled to another memory channel. In yet other embodiments the near memory and far memory devices may communicate to the host side memory controller through a same memory channel. The near memory and/or far memory devices may be integrated in a same semiconductor chip package(s) as the processing cores and memory controller, or, may be integrated outside the semiconductor chip package(s).

In one particular approach, far memory can be (or is) coupled to the host side memory controller through a point-to-point link 221 such as a Peripheral Component Interconnect Express (PCIe) point-to-point link having a set of specifications published by the Peripheral Component Interconnect Special Interest Group (PCI-SIG) (e.g., as found at pcisig.com/specifications/pciexpress). For example, as observed in FIG. 2, the far memory 214 may be coupled directly to a far memory controller 220, and, a point-to-point link 221 couples the far memory controller 220 to the main host side memory controller 216.

The far memory controller 220 performs various tasks that are, e.g., specific to emerging non volatile memory devices that may be used for far memory devices 214. For example, the far memory controller 220 may apply signals to the far memory devices 214 having special voltages and/or timing requirements, may manage the movement/rotation of more frequently accessed data to less frequently accessed storage cells (transparently to the system's system memory addressing organization from the perspective of the processing cores under a process known as wear leveling) and/or may identify groups of bad storage cells and prevent their future usage (also known as bad block management).

The point-to-point link 221 to the far memory controller 220 may be a computing system's primary mechanism for carrying far memory traffic to/from the host side (main) memory controller 216 and/or, the system may permit for multiple far memory controllers and corresponding far memory devices as memory expansion "plug-ins".

In various embodiments, the memory expansion plug-in solutions may be implemented with point-to-point links (e.g., one PCIe link per plug-in). Non expanded far memory (provided as part of the basic original system) may or may not be implemented with point-to-point links (e.g., dual in line memory module (DIMM) cards having near memory devices, far memory devices or a combination of near and far memory devices may be plugged into a double data rate (DDR) memory channel that emanates from the main memory controller).

2.0 Far Memory Compression/Decompression to Improve Link Efficiency

Figure 2:
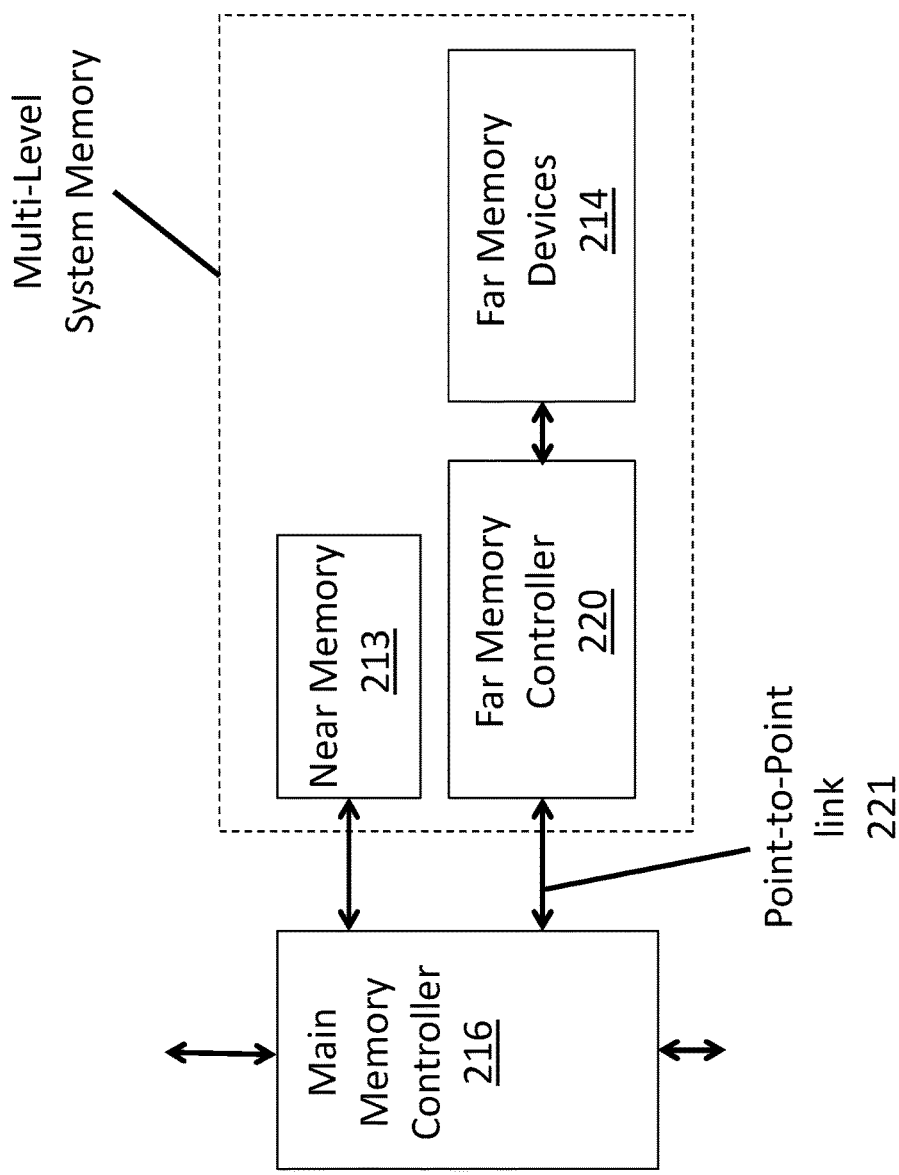
FIG. 2 shows a main memory controller and a far memory controller.

A concern with connecting a main memory controller 216 to a far memory controller 220 as observed in FIG. 2 is the bandwidth of the point-to-point link 221 in view of the size/capacity of far memory and the number of processing cores that may desire to access the far memory. In the case of a large multi-core processor system, each processing core may desire to access far memory. In systems where multiple multi-processor system on chips (SoCs) are coupled to together, the memory controller of each SoC may be allocated its own unique "slice" of system memory address space any every processing core of every SoC is able to access any system memory slice of any SoC.

As such, the number of processing cores that may seek access to any particular memory controller and its corresponding far memory devices may be quite large, and, as alluded to above in the preceding section, e.g., three dimensional emerging technologies used as far memory devices may exhibit much larger storage densities than traditional DRAM. The combination of large numbers of processing cores utilizing large amounts of data kept in far memory can correspond to the generation of extremely large amounts of traffic over the point-to-point link 221.

As such, it is conceivable that the link 221 may be a bottleneck in the system where software executing on the processing cores executes slower because the processing cores are often waiting for instructions/data from far memory that are delayed because of the slowness of the link 221. The problem is only compounded when input and/or output (I/O) traffic (e.g., between far memory and one or more networking adapters) and graphics traffic (e.g., between far memory and a graphics processing unit (GPU)) are accounted for.

Figure 3:
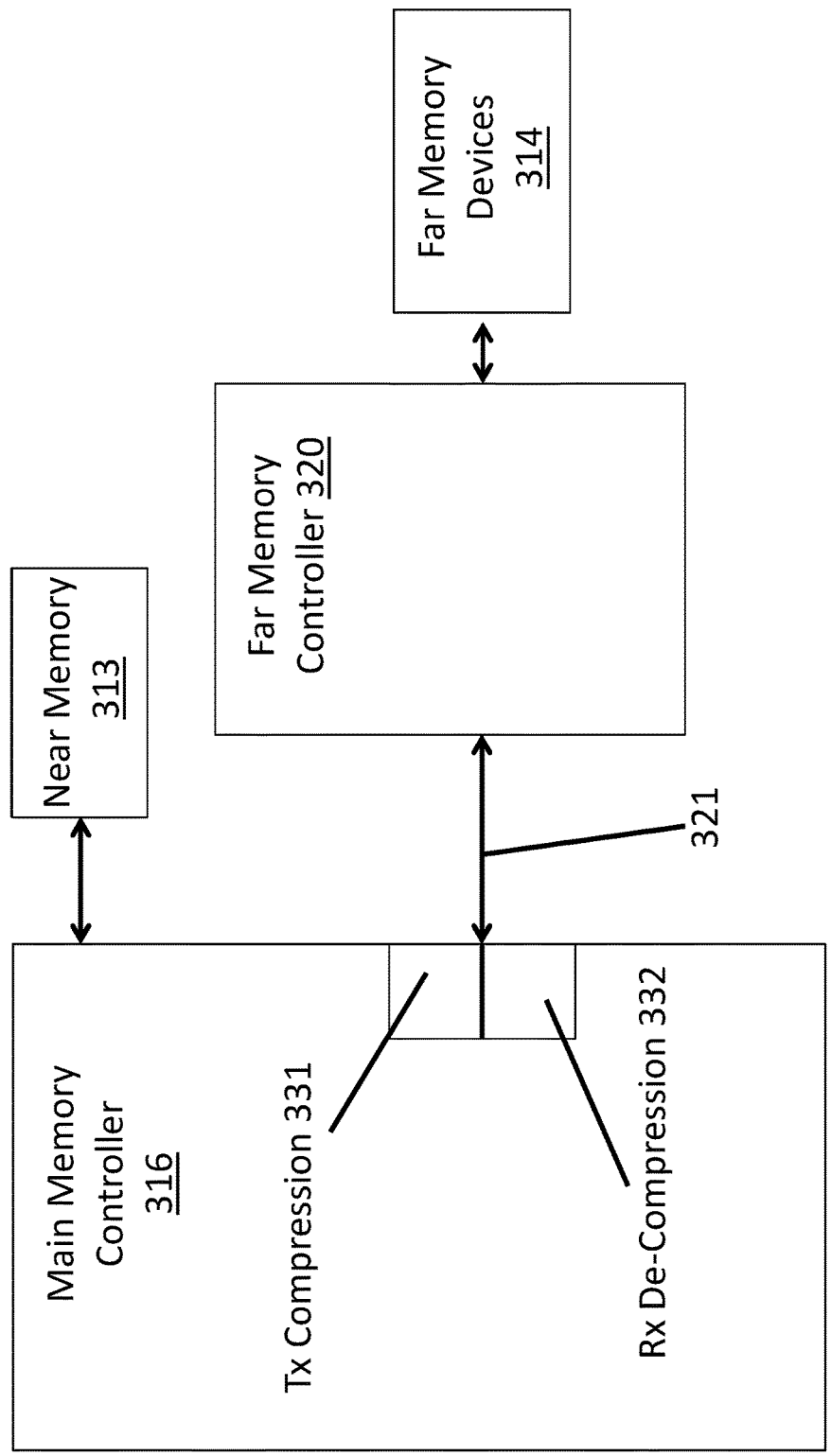
FIG. 3 shows a main memory controller having compression logic circuitry and decompression logic circuitry.

A solution, as observed in FIG. 3, is to implement some form of compression 331 on the main memory controller 316 transmit end that transmits compressed data to the far memory controller 320 over the link 321, and/or, exhibit some form of decompression 322 on the main memory controller 316 receiving end that receives compressed data sent from the far memory controller over the link 321.

With this arrangement, by definition, the link 321 transports compressed information from the main memory controller 316 to the far memory controller 320 and/or from the far memory controller 320 to the main memory controller 316. The transportation of compressed information over link 321 corresponds to an immediate increase in realized bandwidth of the link 321 because the link 321 will be able to transport more information for a fixed baud rate.

In an embodiment, the link 321 is configured to transmit packets of a certain size or size range from the main memory controller 316 to the far memory controller 320. The compression 331 performed by the main memory controller 316, in various embodiments, attempts to compress two or more write cache lines worth of data into a single packet. In one embodiment, the packet size is approximately commensurate with a full sized cache line. Thus, compressing content from two or more write cache lines into a single packet immediately provides a link performance improvement as compared to a system without compression.

Notably, the size of the packet, which is a feature of the link technology, affects the number of cache lines worth of information that should be compressed to realize an effective bandwidth improvement. For example, if the packet structure were nominally large enough to hold two full cache lines worth of information, then, an effective bandwidth improvement would be realized if three or more cache lines worth of information can be compressed into a single packet. Thus, more generally, transmit (Tx) compression 331 should be able to compress more cache lines worth of information into a single packet than would otherwise be achievable without any compression.

In various embodiments, as alluded to above, the packet size can be varied. Here, as is understood in the art, a link, such as link 321, is composed of various layers such as a physical layer, a data link layer above the physical layer and a transaction layer above the data link layer. In various embodiments, either or both the data link and transaction layers support variable sized packets (e.g., the PCIe transaction layer supports variable packet size).

In various embodiments, rather than compress more than one cache line into a single packet, a single cache line is compressed into a smaller packet than otherwise would have been realized without the compression and the data link and/or transaction layer supports the reduced packet size. In this case, the system sends smaller packets than a system without compression where both systems include only one cache line per packet. Link bandwidth improvement is still realized in this case for the same reasons expressed above (more information is transported for a same baud rate).

In yet other embodiments, because of the variable packet size, the memory controller can dynamically place one or more compressed cache lines (not just more than one compressed cache line) into a single packet. That is, for instance, some packets may include only one compressed cache line whereas other packets may include more than one compressed cache line and a number of such packets are all of a different size.

Here, different uncompressed cache line data patterns are understood to be capable of different amounts of compression (some data patterns permit extreme compression whereas other data patterns permit only some compression). As such, with the amount of compression per cache line having some variability and with, e.g., variable packet sizes, the sizes of the compressed caches and the numbers of compressed cache lines per packet can widely vary over an extended run time of the system.

Further still, the memory controller may be designed to not provide any compression for one or more cache lines (e.g., depending on the requester/user, the core that issued the system memory request, etc.). As such, the link may, over its run time, transport a mixture of packets having uncompressed cache lines and packets having compressed cache lines where at least the packets having compressed cache lines can vary in size and/or contain different numbers of compressed cache lines (including one compressed cache line per packet).

For ease of discussion the following discussion assumes that more than one cache line has been compressed into a single packet. The reader should recognize that any information or process in the following discussion that is directed to handling more than one compressed cache line per packet can be obviated for those packets having only one compressed cache line.

Similarly, receive (Rx) decompression 332 on the memory controller receive end operates to expand a single read response packet that is sent by the far memory 320 controller over the link 316 into multiple read cache lines, where, one or more of the reconstituted cache lines may be provided to one or more requesting entities (e.g., processing core(s), GPU(s), networking adapter(s), etc.) that issued one or more read requests that caused the packet that was received from the link to be fetched.

Figure 4A:
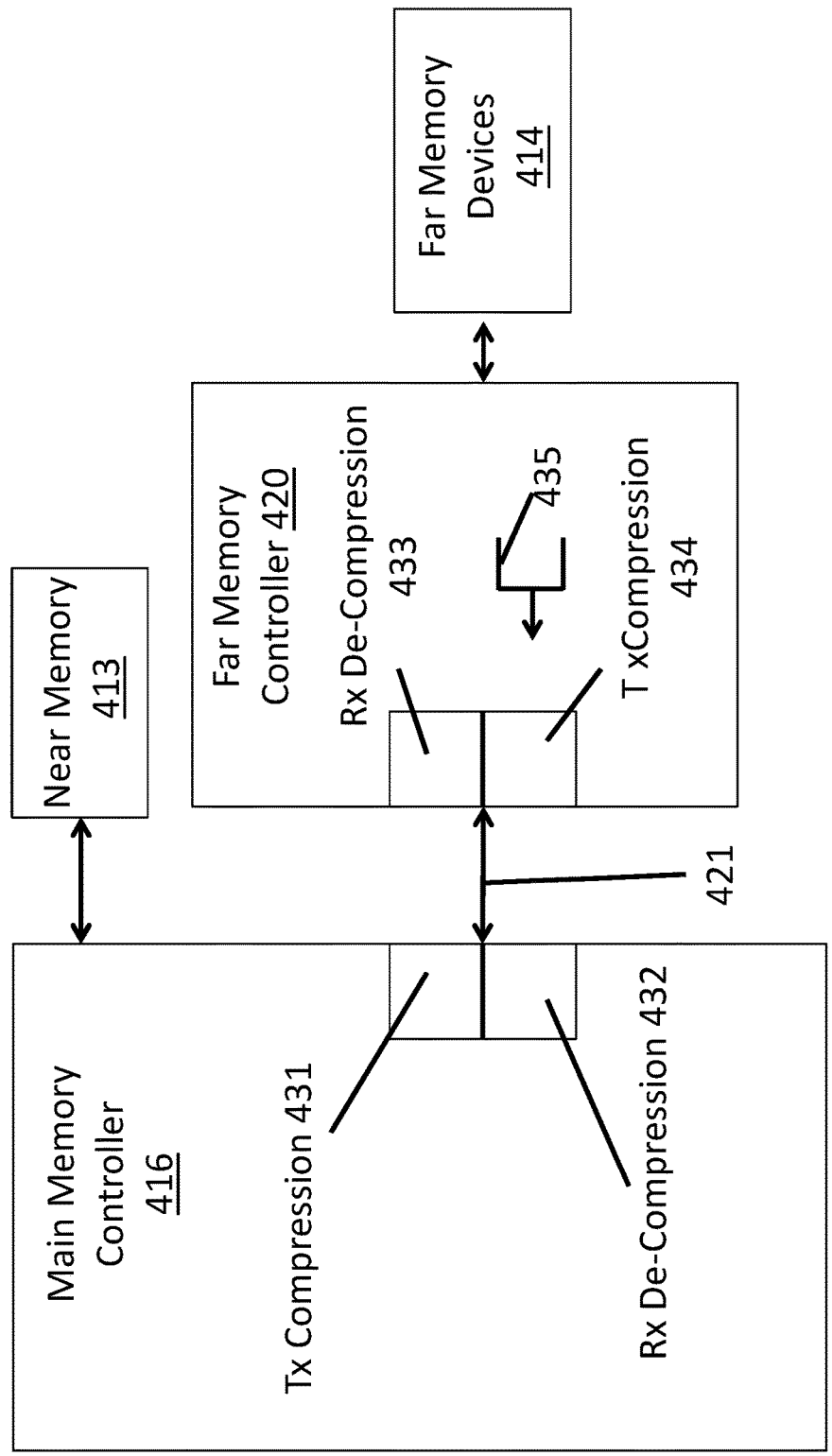
FIGS. 4a, 4b and 4c show different embodiments that include the main memory controller of FIG. 3.
Figure 4B:
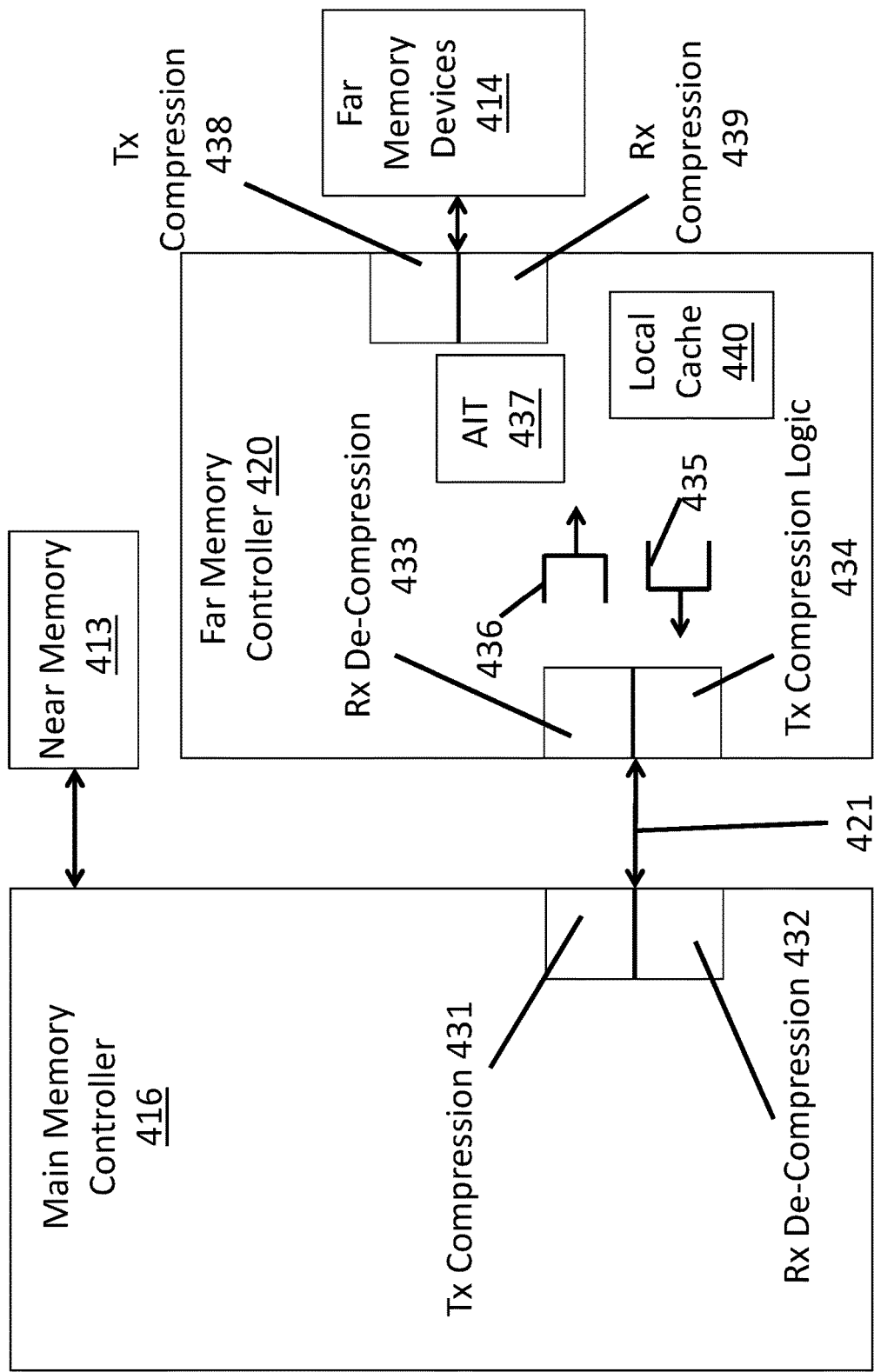
Figure 4C:
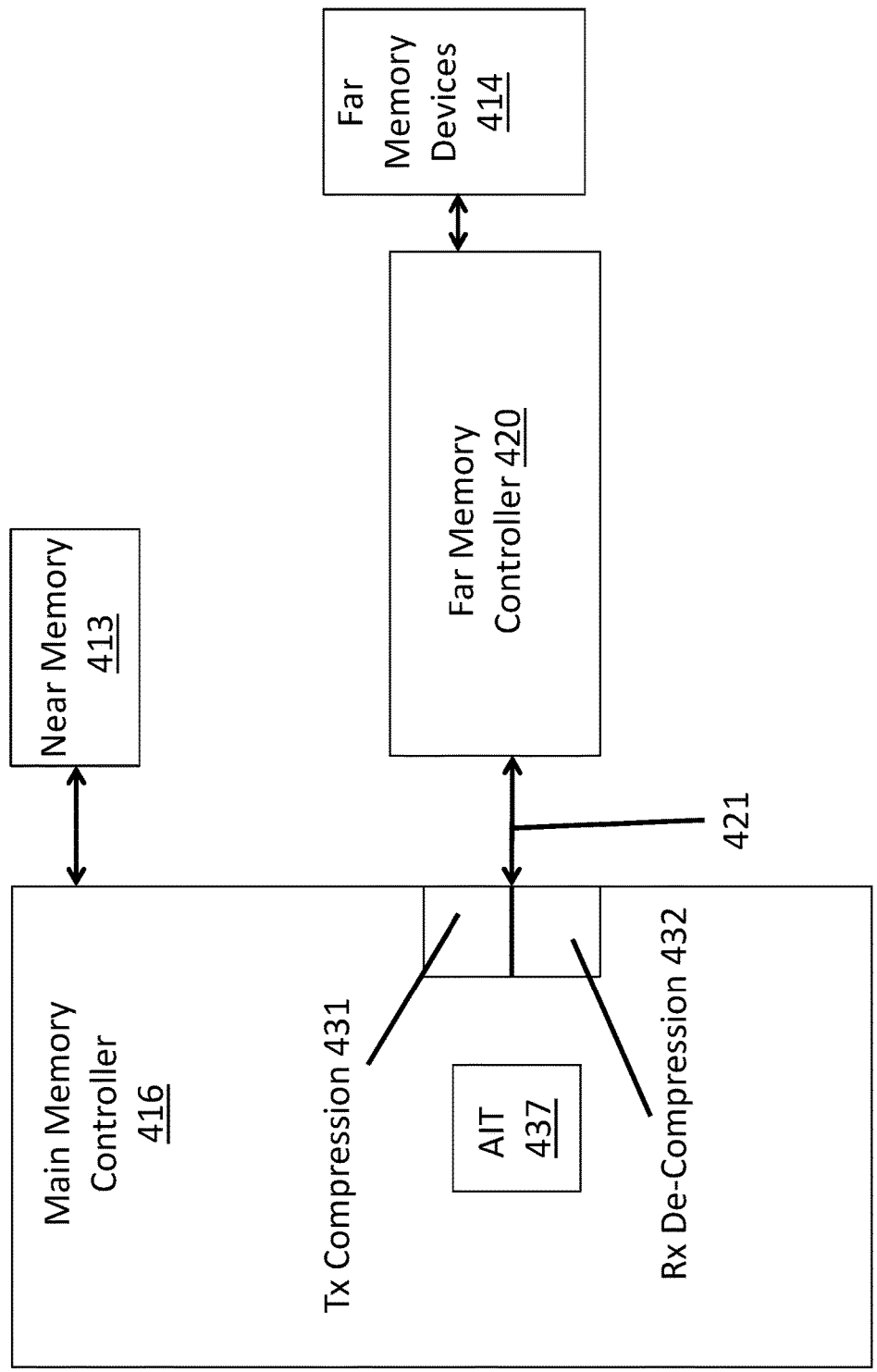

FIGS. 4a through 4c show different embodiments for implementing the basic design approach of FIG. 3. As observed in FIG. 4a, after Tx compression 431 is performed by the main memory controller 416 and a packet containing two or more compressed write cache lines is sent over the link 421, the far memory controller 420 decompresses the compressed cache lines contained in the packet resulting in RX de-compression 433 and writes the decompressed cache lines into the far memory devices 414. In an embodiment, the system memory address of each constituent cache line in the packet is included as meta data in the packet so that the far memory controller 420 can comprehend the system memory address for each individual decompressed cache line and store it accordingly in the far memory devices 414.

In the case of a read, particularly in times of high traffic, multiple read requests are sent to the far memory controller 420 by the main memory controller 416 (here, e.g., multiple read requests may be contained in a single packet that is sent from the main memory controller 416 to the far memory controller 420). The far memory controller 420, upon receipt of the requests, fetches the requested cache lines and places them in an outbound queue 435 within far memory controller 420. Compression logic 434 in the far memory controller 420 then attempts to compress two or more outbound cache lines in the outbound queue 435 for inclusion into a single packet that is sent from the far memory controller 420 to the main memory controller 416 over the link 421.

In an embodiment, the packet contains some meta data that indicates which requested read cache lines are contained in the packet. For example, in an embodiment, each read request that is sent to the far memory controller by the main memory controller contains a unique ID which may be, but need not necessarily be, the system memory address of each requested cache line. As part of the read request servicing performed by the far memory controller 420, when compressing two or more read cache lines into a same read response packet, the packet contains meta data that includes the unique IDs of its constituent compressed cache lines so that the main memory controller 416 upon receipt of the read response packet is able to identify which of its outstanding read requests have been provided in the newly received packet.

In general, for packets that are either sent from the main memory controller 416 (to the far memory controller 420) or to the main memory controller 416 (from the far memory controller 420), the packet may contain meta data that indicates the boundaries in the packet payload between the different compressed cache lines that are contained in the packet. Notably, in the approach of FIG. 4a, as discussed above, the far memory controller 420 fully decompresses write cache lines before storing them in the far memory devices 414. That is, decompressed cache lines are physically stored in the far memory devices 414.

FIG. 4b shows another implementation that stores compressed cache lines in the far memory devices 414 rather than decompressed cache lines as in the embodiment described just above with respect to FIG. 4a. Here, as observed in FIG. 4b, and similar to the approach of FIG. 4a, the far memory controller 420 receives a packet containing compressed write cache lines and decompresses the cache lines to produce Rx de-compression 433, e.g., multiple write cache lines and their corresponding system memory addresses. The far memory controller 420 places the de-compressed write cache lines in an inbound write queue 436.

The far memory controller 420 then performs Tx compression 438 of the content of two or more individual write cache lines in the inbound queue 436 resulting in a single cache line and then stores the single cache line into the far memory devices 414. As part of the physical storage of a compressed cache line, the far memory controller updates an address indirection table (AIT) 437 which is a table that records which system memory addresses have their cache line content stored in which physical memory address locations of far memory devices 414. In this case, the AIT 437 is updated to indicate that the respective system memory addresses of the constituent cache lines of a compressed cache line are stored at a same physical memory address of far memory devices 414.

In another embodiment, rather than decompress 433 the cache lines that are contained in a packet that has been received from the main memory controller 416 and place the decompressed cache lines into an inbound queue 436, instead, the far memory controller 420 simply places the packet payload containing the compressed cache lines in the inbound queue 436. The payload containing the compressed cache lines is then used to consume at least one cache line which is written into the far memory devices 414 from the inbound queue 436 (Tx compression 438 is not performed). That is, cache lines that are compressed together in the packet that is received from the main memory controller 416 are also stored compressed together as a cache line in far memory devices 414.

Here, the meta contained in the packet is processed by the far memory controller 420 to identify the individual system memory address for each constituent cache line in the packet. Recognizing the system memory address for each constituent cache line, the far memory controller is able to update the AIT 437 when writing the packet payload as a cache line into the far memory devices 414. That is, the system memory addresses of the cache lines contained with a same packet will map to the same physical memory address of far memory devices 414 in the AIT 437.

In the case of a read request, which specifies the system memory address of the desired cache line, the far memory controller 420 performs a look-up into the AIT 437 to fetch the compressed cache line in far memory devices 414 that contains the compressed content of the requested cache line. In an embodiment, the cache line containing the request cache line is read from the far memory devices 414 and is decompressed. In an embodiment, only the requested cache line is entered into the outbound queue 435. Read service processing as described above with respect to FIG. 4a is then performed including Tx compression 434 of outbound cache lines by the far memory controller 420 so that compressed cache lines are sent over the link 421 from the far memory controller 420 to the main memory controller 416.

In another embodiment, the far memory controller 420 does not decompress the individual cache lines that are contained within a compressed cache line read from far memory devices 414. Instead, such compressed content remains compressed in the far memory controller 420 and is transmitted from the far memory controller 420 to the main memory controller in the same compressed format they were stored in physical memory as (as such, Rx decompression 439 and Tx compression 434 are not performed). The compressed cache lines may be placed in the output queue 435 and packed into packets containing multiple compressed cache lines that are sent to the main memory controller 416.

In a further embodiment, the content of a compressed cache line read from far memory devices 414 (and therefore containing multiple compressed cache lines worth of information) is sent in its entirety in a packet that is sent from the far memory controller to the main memory controller (i.e., cache lines that are compressed together in physical memory are also sent to the main memory controller compressed together in the same packet).

In yet other embodiments, the far memory controller 420 may include a local cache 440 to keep compressed or decompressed cache lines that were not the target of the read request. For example, consider a situation in which three cache lines worth of information are compressed into a single cache line that is stored in the far memory devices 414. If a subsequent read request is received by the far memory controller 420 for only one of the three cache lines, a cache line containing the compressed content of the desired cache line and two other cache lines will be fetched from the far memory devices 414.

The other two unrequested cache lines, therefore, may be placed in the memory controller's local cache 440, e.g., in a compressed or decompressed format. If a subsequent read request is received soon thereafter for one of these two cache lines the read request can be serviced by the far memory controller 420 directly from the local cache without having to perform a read into the far memory devices 414.

As such, in an embodiment, any read request that is processed by the far memory controller 420 includes the far memory controller performing a look-up into the far memory controller's local cache 440 for the requested cache line before submitting a read request to the far memory devices 414. In various embodiments, the local cache 440 may be limited in size so that, on average, the local cache 440 only holds unrequested cache lines for a limited amount of time before being evicted from the local cache 440 to make room for newly unrequested cache lines. Thus, the size of the local cache 440 in various embodiments may be commensurate to hold, e.g., during nominal traffic flows, unrequested cache lines for a time period that is approximately the amount of time a request for an unrequested cache should be received if principles of spatial and/or temporal locality apply.

FIG. 4c shows another embodiment where the far memory controller 420 does not perform any compression or decompression. Here, the AIT 437 is maintained by the main memory controller 416. When the content of multiple cache lines are compressed via Tx compression 431 into the payload of a single packet by the main memory controller 416, the system memory addresses of these cache lines are correlated to a same far memory system memory address for far memory devices 414 in the AIT 437. The packet with the compressed cache lines are then sent to the far memory controller 420 with the same far memory system memory address for far memory devices 414. The far memory controller 420 stores the packet payload, e.g., as a single write cache line, in the far memory devices 414 at the specified address.

When a read request is received by the main memory controller 416, a look-up into the AIT 437 is performed to identify the far memory system memory address for the requested cache line. A read request containing the far memory system memory address is sent from the main memory controller 416 to the far memory controller 420. The far memory controller 420 uses the far memory system memory address to fetch the far memory cache line that contains the compressed requested cache line (as well as other compressed cache lines). The far memory cache line is then sent, e.g., as a payload within a packet, from the far memory controller 420 to the main memory controller 416.

The main memory controller 416 performs Rx de-compression 432 of the far memory cache line to retrieve the requested cache line and forwards the requested cache line to the requesting entity (e.g., a processing core). In various embodiments the main memory controller 416 may include a local cache that operates similarly to the far memory controller 420 local cache 440 that was discussed just above with respect to FIG. 4*b*.

Although the above discussion only mentioned PCIe as a link technology it is pertinent to point out that other types of links may be used (e.g., Quick Path Interconnect (QPI) or Ultra Path Interconnect (UPI) from Intel Corporation of Santa Clara, Calif. USA). It also pertinent to point out that although embodiments discussed above described compressed traffic over the link in both directions (from main memory controller to far memory controller and from far memory controller to main memory controller), in other embodiments, traffic may be compressed in only one direction over the link. In such cases, however, correct compression/decompression flows must be present as between the two controllers (e.g., if traffic is compressed in the direction from the main memory controller to the far memory controller but not in the direction from the far memory controller to the main memory controller, some form of decompression must exist on the far memory controller).

Although the above discussion focused upon an example showing only a single link between the host side main memory controller and the far memory controller, in various embodiments, there may be multiple links emanating from the main memory controller to, e.g., respective far memory controllers. Here, a single compression and/or decompression block within the main memory controller may handle the compression and/or decompression of all such multiple channels, or, each channel may have its own dedicated compression and/or decompression block or some flavor between these two extremes may be implemented (e.g., a first block handles the compression and/or decompression for a first pair of links, a second block handles the compression and/or decompression for a second pair of links, etc.).

Also, although the above discussion focused upon an example in which the compressed traffic transports information to/from non volatile far memory devices in a multi-level computing system, the reader should understand that such a link could be used in other arrangements (e.g., a link that is coupled to near memory, a link that is not part of a multi-level system memory, a link that is coupled to volatile memory devices, etc.).

The compression and/or decompression described above may be implemented with any combination of dedicated hardware logic circuitry such as custom hardwired logic circuitry, programmable logic array (PLA), programmable logic device (PLD) or field programmable gate array (FPGA) logic circuitry. Alternatively or in combination some form of program code execution may be used to implement the compression and/or decompression. In this case the circuitry includes any kind of logic circuitry capable of executing program code (e.g., controller, microcontroller, embedded controller, digital signal processor (DSP), embedded processor, etc.). The look-up logic of the AIT table may also be implemented with any of the logic circuitry described above. The table entries may be implemented with register or memory (e.g., SRAM) circuitry.

Figure 5:
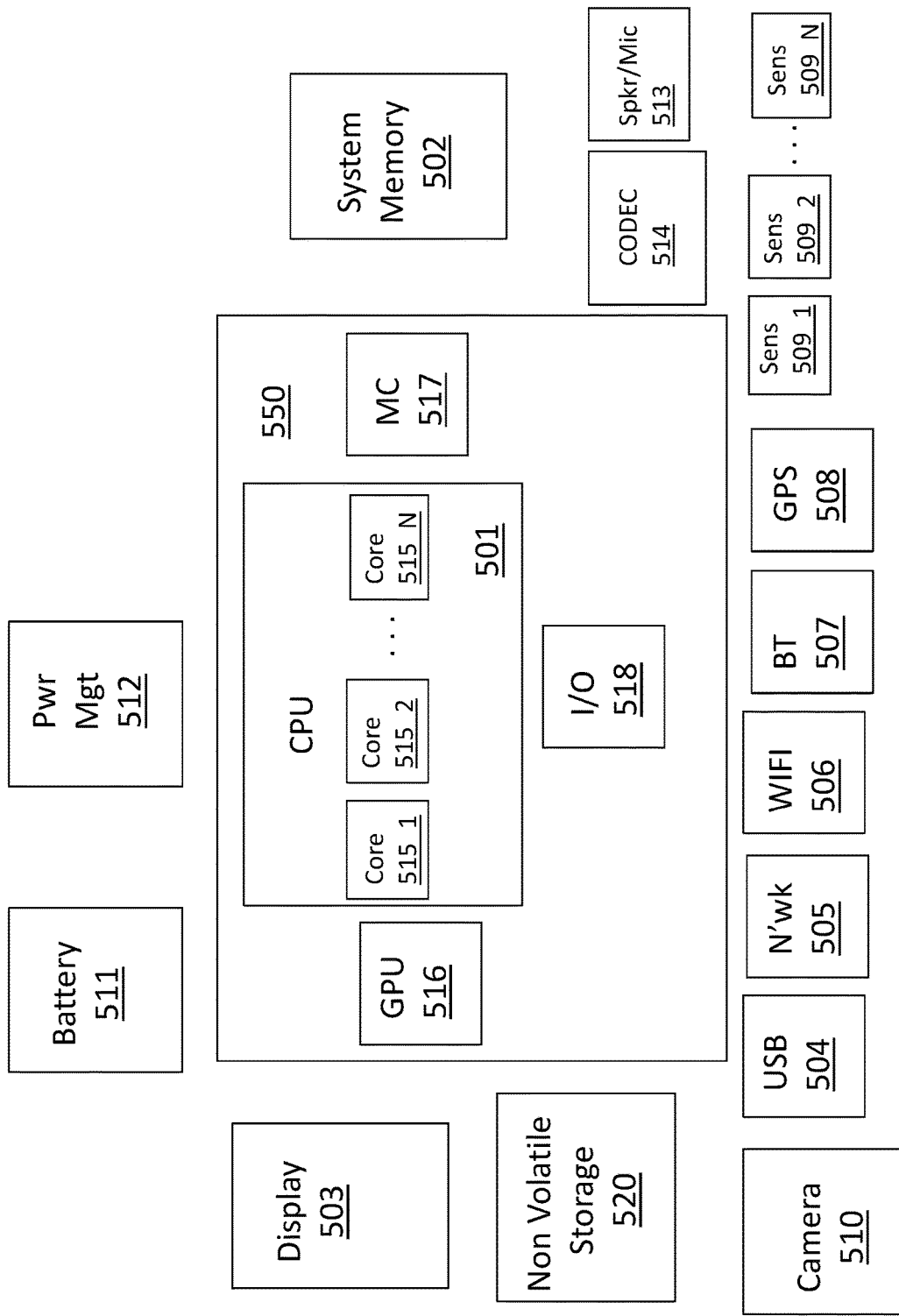
FIG. 5 shows a computing system.

FIG. 5 shows a depiction of an exemplary computing system 500 such as a personal computing system (e.g., desktop or laptop) or a mobile or handheld computing system such as a tablet device or smartphone, or, a larger computing system such as a server computing system. As observed in FIG. 5, the basic computing system may include a central processing unit 501 (which may include, e.g., a plurality of general purpose processing cores and a main memory controller disposed on an applications processor or multi-core processor), system memory 502, a display 503 (e.g., touchscreen, flat-panel), a local wired point-to-point link (e.g., USB) interface 504, various network I/O functions 505 (such as an Ethernet interface and/or cellular modem subsystem), a wireless local area network (e.g., WiFi) interface 506, a wireless point-to-point link (e.g., Bluetooth) interface 507 and a Global Positioning System interface 508, various sensors 509_1 through 509_N (e.g., one or more of a gyroscope, an accelerometer, a magnetometer, a temperature sensor, a pressure sensor, a humidity sensor, etc.), a camera 510, a battery 511, a power management control unit 512, a speaker and microphone 513 and an audio coder/decoder 514.

An applications processor or multi-core processor 550 may include one or more general purpose processing cores 515 within its CPU 501, one or more graphical processing units 516, a memory management function 517 (e.g., a memory controller) and an I/O control function 518. The general purpose processing cores 515 typically execute the operating system and application software of the computing system. The graphics processing units 516 typically execute graphics intensive functions to, e.g., generate graphics information that is presented on the display 503. The memory control function 517 interfaces with the system memory 502. The system memory 502 may be a multi-level system memory.

The memory function 517 may include a main memory controller and far memory controller that transport compress system memory traffic between one another as described above.

Each of the touchscreen display 503, the communication interfaces 504-507, the GPS interface 508, the sensors 509, the camera 510, and the speaker/microphone codec 513, 514 all can be viewed as various forms of I/O (input and/or output) relative to the overall computing system including, where appropriate, an integrated peripheral device as well (e.g., the camera 510). Depending on implementation, various ones of these I/O components may be integrated on the applications processor/multi-core processor 550 or may be located off the die or outside the package of the applications processor/multi-core processor 550. The mass storage of the computing system may be implemented with non volatile storage 520 which may be coupled to the I/O controller 518 (which may also be referred to as a peripheral control hub).

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of software or instruction programmed computer components or custom hardware components, such as application specific integrated circuits (ASIC), programmable logic devices (PLD), programmable logic arrays (PLAs), or field programmable gate array (FPGA).

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

An apparatus has been described above that includes a point-to-point link interface to couple to a point-to-point link. The point-to-point link is to transport system memory traffic between the main memory controller and a main memory. The main memory controller includes at least one of: compression logic circuitry to compress write information prior to being transmitted over the link; decompression logic circuitry to decompress read information after being received from the link.

In at least one embodiment the main memory controller includes both the compression logic circuitry and the decompression logic circuitry. In at least one embodiment the point-to-point link is to transmit packets having a payload size commensurate with a first number of uncompressed cache lines and the compression logic circuitry is to compress a second number of uncompressed cache lines into the payload of a packet to be transmitted, where, the second number is larger than the first number.

In at least one embodiment the point-to-point link is able to transmit packets of variable size and at least some packets carry only a single compressed cache line. In at least one embodiment the main memory controller includes address indirection table circuitry to correlate system memory addresses of cache lines that are compressed together into a same cache line. In at least one embodiment the main memory controller includes a local cache to keep cache lines that were decompressed by the decompression logic circuitry but that were not requested by a read request.

Another apparatus has also been described which includes a non volatile memory controller including a point-to-point link interface to couple to a point-to-point link. The point-to-point link is to transport system memory traffic of a multi-level system memory between a main memory controller and the non volatile memory controller. The non volatile memory controller is to interface to non volatile memory of the multi-level system memory. The non volatile memory controller includes at least one of: i) compression logic circuitry to compress write information prior to being written into said non volatile memory; ii) compression logic circuitry to compress read information prior to being transmitted over said point-to-point link to said main memory controller; iii) decompression logic circuitry to decompress read information read from said non volatile memory; iv) decompression logic circuitry to decompress write information received from said point-to-point link.

In an embodiment the non volatile memory controller includes ii) and iii) above. In a further embodiment the non volatile memory controller includes i), ii), iii) and iv) above.

In an embodiment the non volatile memory controller includes an outbound queue that feeds the point-to-point link in the non volatile memory controller to main memory controller direction. In a further embodiment the outbound queue is to queue compressed read cache lines.

In an embodiment the non volatile memory controller includes an inbound queue that feeds write information to the non volatile memory. In a further embodiment the inbound queue is to queue packet payloads comprising compressed read cache lines.

In an embodiment the non volatile memory controller includes address indirection table circuitry to correlate system memory addresses of cache lines that are compressed together into a same cache line stored in the non volatile memory. In an embodiment the non volatile memory controller includes a local cache to keep cache lines that were decompressed by the decompression logic circuitry of iii) but that were not requested by a read request.

In an embodiment the non volatile memory is composed of any of: a) phase change memory; b) chalcogenide; c) ferro-electric based memory (e.g., FRAM); d) a magnetic based memory (e.g., MRAM); e) a spin transfer torque based memory (e.g., STT-RAM); f) a resistor based memory (e.g., ReRAM); g) an Memristor based memory; h) Ovshinsky memory.

A computing system comprising either or both of the apparatuses has also been described.

A method has also been described. The method includes performing at least one of the following by a memory controller: i) compressing first system memory traffic prior to sending the first system memory traffic over a first point-to-point link toward a first system memory device; ii) decompressing second system memory traffic after receiving the second system memory traffic from a second point-to-point link that received the second system memory traffic from a second system memory device; iii) decompressing third system memory traffic after receiving the third system memory traffic from a third point-to-point link that received the third system memory traffic from a main memory controller; iv) compressing fourth system memory traffic prior to sending said fourth system memory traffic over a fourth point-to-point link toward a main memory controller.

In an embodiment the controller resides between at least one of: a) the first point-to-point link and the first system memory device; b) the second point-to-point link and the second system memory device.

In an embodiment at least one of the first system memory device and the second system memory device is a non volatile memory device. In a further embodiment, the non volatile memory device is composed of any of: a) a phase change memory; b) chalcogenide; c) a ferro-electric based memory (e.g., FRAM); d) a magnetic based memory (e.g., MRAM); e) a spin transfer torque based memory (e.g., STT-RAM); f) a resistor based memory (e.g., ReRAM); g) an Memristor based memory; h) Ovshinsky memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a main memory controller including a point-to-point link interface to couple to a point-to-point link, said point-to-point link to transport system memory traffic between said main memory controller and a main memory, said main memory controller including at least one of:
compression logic circuitry to compress write information prior to being transmitted over the point-to-point link, said compression logic circuitry to compress the write information of different numbers of write cache lines into different write packets that are transported over said point-to-point link as a function of variable packet length sizes that are transportable over said point-to-point link and different amounts by which the write cache lines are compressible;
decompression logic circuitry to decompress read information after being received from the point-to-point link, said decompression logic circuitry to decompress the read information of different numbers of read cache lines from different read packets that are transported over said point-to-point link as a function of variable packet length sizes that are transportable over said point-to-point link and different amounts by which the read cache lines are compressible.

2. The apparatus of claim 1 wherein the main memory controller includes both the compression logic circuitry and the decompression logic circuitry.

3. The apparatus of claim 1 wherein the point-to-point link is to transmit packets having a payload size commensurate with a first number of uncompressed cache lines and the compression logic circuitry is to compress a second number of uncompressed cache lines into a payload of a packet to be transmitted, the second number being larger than the first number.

4. The apparatus of claim 1 wherein the main memory controller includes address indirection table circuitry to correlate system memory addresses of cache lines that are compressed together into a same cache line.

5. The apparatus of claim 1 wherein the main memory controller includes a local cache to keep cache lines that were decompressed by the decompression logic circuitry but that were not requested by a read request.

6. An apparatus, comprising:
a non volatile memory controller including a point-to-point link interface to couple to a point-to-point link, said point-to-point link to transport system memory traffic of a multi-level system memory between a main memory controller and said non volatile memory controller, said non volatile memory controller to interface to non volatile memory of said multi-level system memory, said non volatile memory controller including decompression logic circuitry to decompress read information read from said non volatile memory, wherein the non volatile memory controller includes a local cache to keep cache lines that were decompressed by the decompression logic circuitry but that were not requested by a read request.

7. The apparatus of claim 6 wherein the non volatile memory controller further comprises compression logic circuitry to compress read information prior to being transmitted over said point-to-point link to said main memory controller.

8. The apparatus of claim 7 wherein the non volatile memory controller further comprises at least one of:
compression logic circuitry to compress write information prior to being written into said non volatile memory;
decompression logic circuitry to decompress write information received from said point-to-point link.

9. The apparatus of claim 6 wherein the non volatile memory controller includes an outbound queue that feeds the point-to-point link in the non volatile memory controller to main memory controller direction.

10. The apparatus of claim 9 wherein the outbound queue is to queue compressed read cache lines.

11. The apparatus of claim 6 wherein the non volatile memory controller includes an inbound queue that feeds write information to the non volatile memory.

12. The apparatus of claim 11 wherein the inbound queue is to queue packet payloads comprising compressed read cache lines.

13. The apparatus of claim 6 wherein the non volatile memory controller includes address indirection table circuitry to correlate system memory addresses of cache lines that are compressed together into a same cache line stored in the non volatile memory.

14. The apparatus of claim 6 further wherein said non volatile memory is composed of any of:
a) phase change memory;
b) chalcogenide;
c) ferro-electric based memory (e.g., FRAM);
d) a magnetic based memory (e.g., MRAM);
e) a spin transfer torque based memory (e.g., STT-RAM);
f) a resistor based memory (e.g., ReRAM);
g) an Memristor based memory;
h) Ovshinsky memory.

15. A computing system, comprising:
one or more processing cores;
a multi-level system memory;
a point-to-point link;
a main memory controller including a point-to-point link interface to couple to said point-to-point link, said point-to-point link to transport system memory traffic of said multi-level system memory between said main memory controller and a controller that interfaces to non volatile memory of said multi-level system memory, said main memory controller including at least one of:
compression logic circuitry to compress write information prior to being transmitted over the point-to-point link, said compression logic circuitry to compress the write information of different numbers of write cache lines into different write packets that are transported over said point-to-point link as a function of variable packet length sizes that are transportable over said point-to-point link and different amounts by which the write cache lines are compressible;
decompression logic circuitry to decompress read information after being received from the point-to-point link, said decompression logic circuitry to decompress the read information of different numbers of read cache lines from different read packets that are transported over said point-to-point link as a function of variable packet length sizes that are transportable over said point-to-point link and different amounts by which the read cache lines are compressible.

16. The computing system of claim 15 wherein the controller that interfaces to the non volatile memory further includes at least one of:
   i) compression logic circuitry to compress write information prior to being written into said non volatile memory;
   ii) compression logic circuitry to compress read information prior to being transmitted over said point-to-point link to said main memory controller;
   iii) decompression logic circuitry to decompress read information read from said non volatile memory;
   iv) decompression logic circuitry to decompress write information received from said point-to-point link.

17. The computing system of claim 16 wherein the controller includes a local cache to keep cache lines that were decompressed by the decompression logic circuitry of iii) above but that were not requested by a read request.

18. The computing system of claim 15 wherein either the main memory controller or the controller includes an address indirection table circuitry to correlate system memory addresses of cache lines that are compressed together into a same cache line stored in the non volatile memory.

19. The computing system of claim 15 wherein the main memory controller includes a local cache to keep cache lines that were decompressed by the decompression logic circuitry of but that were not requested by a read request.

20. A method comprising:
   performing at least one of the following by a memory controller:
   i) compressing first system memory traffic prior to sending said first system memory traffic over a first point-to-point link toward a first system memory device, said compressing further comprising compressing information of different numbers of first cache lines into different first packets that are transported over said first point-to-point link as a function of variable packet length sizes that are transportable over said first point-to-point link and different amounts by which the first cache lines are compressible;
   ii) decompressing second system memory traffic after receiving said second system memory traffic from a second point-to-point link that received said second system memory traffic from a second system memory device, said decompressing further comprising decompressing information of different numbers of second cache lines from different second packets that are transported over said second point-to-point link as a function of variable packet length sizes that are transportable over said second point-to-point link and different amounts by which the second cache lines are compressible.

21. The method of claim 20 wherein a controller resides between at least one of:
   a) said first point-to-point link and said first system memory device;
   b) said second point-to-point link and said second system memory device.

22. The method of claim 20 wherein at least one of said first system memory device and said second system memory device is a non volatile memory device.

23. The method of claim 22 wherein said non volatile memory device is composed of any of:
   a) a phase change memory;
   b) chalcogenide;
   c) a ferro-electric based memory (e.g., FRAM);
   d) a magnetic based memory (e.g., MRAM);
   e) a spin transfer torque based memory (e.g., STT-RAM);
   f) a resistor based memory (e.g., ReRAM);
   g) an Memristor based memory;
   h) Ovshinsky memory.

* * * * *